United States Patent [19]

Yoshimura et al.

[11] 3,923,600

[45] Dec. 2, 1975

[54] PURIFICATION OF MICROORGANISM CELLS LYTIC ENZYME

[75] Inventors: Yoshio Yoshimura, Nishinomiya; Kanae Yokogawa, Nara; Shinzo Nishimura, Osaka, all of Japan

[73] Assignee: Dainippon Pharmaceutical Co., Ltd., Osaka, Japan

[22] Filed: Jan. 2, 1973

[21] Appl. No.: 320,193

[30] Foreign Application Priority Data
Oct. 24, 1972  Japan.............................. 47-106538

[52] U.S. Cl................................. 195/66 R; 195/62
[51] Int. Cl.² .................. C07G 7/028; C12D 13/10
[58] Field of Search...................... 195/66 R, 62, 65

[56] References Cited
UNITED STATES PATENTS

| | | | |
|---|---|---|---|
| 3,616,233 | 10/1971 | Schleich............................ | 195/66 R |
| 3,658,650 | 4/1972 | Okazaki............................ | 195/66 R |
| 3,661,715 | 5/1972 | Bonnat et al...................... | 195/66 R |

FOREIGN PATENTS OR APPLICATIONS
5,190    2/1967    Japan

OTHER PUBLICATIONS
Sugimoto, Agricultural and Biological Chemistry, Vol. 31, No. 10, pages 1111-1123 (1967).

*Primary Examiner*—Lionel M. Shapiro
*Attorney, Agent, or Firm*—Stevens, Davis, Miller & Mosher

[57] ABSTRACT

Method for purifying a micoorganism cells lytic enzyme by lowering the pH value of the aqueous solution containing the micoorganism cells lytic enzyme and proteases within a range of about 3.0 to 1.0 with an acid and, if necessary, by neutralizing the acidic mixture within a range of pH about 4.0 to 8.0 with an alkali and then filtering off the resulting precipitates and thereby removing off the proteases contaminated in the micoorganism cells lytic enzyme; the microorganism cells lytic enzyme being produced by cultivating a microorganism of the genus Streptomyces, e.g. S-1 strain (*Streptomyces diastatochromogenes*; ATCC No. 21481), H-191 strain (*Streptomyces farinosus*; ATCC No. 21482), H-402 strain (*Streptomyces griseus var. H-402*; ATCC No. 21483) and B-1829 strain (*Streptomyces globisporus*; ATCC No. 21553).

4 Claims, No Drawings

PURIFICATION OF MICROORGANISM CELLS LYTIC ENZYME

The present invention relates to a method for purifying a microorganism cells lytic enzyme. More particularly, it relates to a method for purifying an enzyme being capable of lysing cells of microorganisms, especially dental caries-inducing microorganisms, which can be produced by cultivating a microorganism of the genus Streptomyces, and a purified microorganism cells lytic enzyme.

It had been previously studied to find out a microorganism being capable of producing a lytic enzyme on the cells of microorganisms such as dental caries-inducing microorganisms in nature and there had then been found out some microorganisms of the genus Streptomyces, e.g. S-1 strain (*Streptomyces diastatochromogenes*; ATCC No. 21481, FERM-P No. 326), H-191 strain (*Streptomyces farinosus*; ATCC No. 21482, FERM-P No. 327), H-402 strain (*Streptomyces griseus* var. H-402; ATCC No. 21483, FERM-P No. 328) and B-1829 strain (*Streptomyces globisporus*; ATCC No. 21553, FERM-P No. 596), in which ATCC means American Type Culture Collection, U.S.A. and FERM means Fermentation Research Institute, Agency of Industrial Science and Technology, Japan.

The microorganism cells lytic enzyme produced by cultivating these microorganisms has superior lytic activity on cells of microorganisms, especially of dental caries-inducing microorganisms and therefore is useful for preventing and treating dental caries and further for inhibiting propagation of microorganisms in other fields.

However, when the microorganism of the genus Streptomyces is cultivated, some impurities other than the present emxyme, particularly proteases are contaminated to the product. It has been found that when the impurities are removed from the product, the present enzyme can have wider utilities.

It has been studied to find out a method for removing the proteases from the culture product to give a highly purified enzyme, and it has been found that the proteases could be hardly removed by conventional purification methods, such as salting out with ammonium sulfate, precipitation by acetone, dialysis and ion-exchange resin or Sephadex chromatography. As the results of further earnest study, it has now been found out that the proteases can be inactivated by lowering the pH value of an aqueous solution containing the present enzyme and the proteases with an acid without giving any undesirable effect on the present enzyme, and that thus inactivated proteases can be readily removed by a conventional filtration.

An object of the present invention is to provide a method for purifying a microorganism cells lytic enzyme.

Another object of the invention is to provide a method for removing proteases from the microorganism cells lytic enzyme-containing product obtained by culturing a microorganism of the genus Streptomyces.

Further object of the invention is to provide a purified microorganism cells lytic enzyme.

These and other objects will be apparent from the description hereinafter.

According to the present invention, an acid is added to an aqueous solution containing a microorganism cells lytic enzyme and proteases, which are produced by cultivating a microorganism of the genus Streptomyces, to lower the pH value to about 3.0 to 1.0, and thereby the proteases are almost inactivated and readily removed off by filtration of the resultant precipitates.

In the above method, the pH value is preferably regulated at about 3.0 to 1.0, more preferably at about 2.5 to 1.5. When the pH value is above 3.0, the protease is insufficiently removed. On the other hand, when it is acidified more than 1.0, the desired microorganism cells lytic enzyme itself is disadvantageously inactivated.

The solution thus obtained can be reserved for a long time without significant lowering of the cells lytic activity, but it is preferable to dehydrate by a conventional method such as lyophilization as soon as possible. However, when the solution is lyophilized as it is in a highly acidic state, the present enzyme is inactivated. Therefore, it is preferable to previously neutralize the solution with an alkali.

That is, after treating with an acid, the solution is regulated at pH about 4.0 to 8.0 and then lyophilized to give the desired pure microorganism cells lytic enzyme. The regulation of the pH value with an alkali is carried out within a range of about 4.0 to 8.0, more preferably in a range of about 5.0 to 7.0. When the pH value is below 4.0, the present enzyme is significantly inactivated by the lyophilization procedure. On the other hand, when it is made alkaline over pH 8.0, the present enzyme is readily inactivated.

According to the treatments above-mentioned, the proteases having the isoelectric point in an acidic area is inactivated and simultaneously precipitated and therefore can be readily removed off by filtration. The filtration may be carried out either before or after the treatment with an alkali, but preferably after the treatment with an alkali and the removement of salts by dialysis or the like. The filtration method may be any conventional method such as by using a filter paper or by centrifuge.

The treatment with an acid and/or alkali can be carried out at any temperature, at which the present enzyme is not inactivated, and usually at room temperature or below. But it is not necessarily required to do at cooled temperature, since there is no difference in the enzymatic activity between the treatments at 4°C and at room temperature. The present enzyme is inactivated when it is treated at 60°C for 20 minutes, but not inactivated if it is treated at a lower temperature than 60°C for a shorter period. It may be, therefore, treated at an elevated temperature (lower than 60°C), if necessary.

The proteases can be instantaneously inactivated by treating with an acid and therefore the solution treated with an acid can be neutralized with an alkali immediately after the treatment with an acid. But, the solution may be optionally reserved for a rather long period as it is acidic.

As the acid used in the present invention, there may be an inorganic acid, such as hydrochloric acid, sulfuric acid and phosphoric acid, and an organic acid such as acetic acid, which can acidify the solution below about 3.0. However, nitric acid can not be used since it reacts with a protein and inactivates the enzyme of the present invention.

As the alkali used in the present invention, there may be a hydroxide, carbonate or bicarbonate of an alkali metal or an alkaline earth metal (e.g. sodium hydroxide, potassium hydroxide, sodium carbonate, potassium carbonate, sodium bicarbonate, potassium bicarbonate, or calcium hydroxide) or ammonia, which can regulate the solution at pH about 4.0 to about 8.0.

The present invention is illustrated by the following examples but not limited thereto.

REFERENCE EXAMPLE

The isolated B-1829 strain was inoculated on a slant agar medium containing 1% of glucose, 0.2% of peptone, 0.1% of yeast extract, 0.1% of meat extract and 1.5% of agar and cultivated at 30°C for 7 days. The obtained spores were inoculated into a 500 ml Sakaguchi flask including 50 ml of liquid medium (pH 7.5) containing 2% of dextrin, 0.5% of soybean powder, 0.25% of peptone, 0.5% of disodium hydrogen phosphate, 0.1% of potassium dihydrogen phosphate, 0.1% of magnesium sulfate and 0.5% of sodium chloride and subjected to shaking culture at 30°C for 3 days. Thus obtained culture broth was separated by filtration to give 49.5 ml of enzyme solution.

In the above procedure, by using the isolated S-1, H-191 or H-402 strain instead of the isolated B-1829 strain, the desired enzyme solution was likewise obtained.

The unit of lytic activity of the present enzyme is calculated according to the following method. 0.4 ml of a suspension of intact cells or heated cells of microorganism to be lysed, for example cariogenic streptococcus (BHT), 2 ml of an enzyme solution diluted in an appropriated concentration and 1.6 ml of 0.025 M tris-HCl buffer (pH 7.0) are mixed to give total 4 ml. The mixture is kept at 37°C for 5 minutes to submit to the cell-lytic reaction. Then the optical density of the reaction mixture is measured at 600 m$\mu$ of a photoelectric colorimeter and the unit of lytic activity of the present enzyme is calculated according to the equation (I). As a control, 2 ml of water is used instead of 2 ml of the enzyme solution.

EXAMPLE 1

The culture broth obtained by cultivating the isolated B-1829 strain with a 100 liters fermentor in the same manner as described in Reference Example was filtered by a filter press to give 70 liters of filtrate. To the filtrate was added 2.8 kg of Amberlite CG 50 (H$^+$ type of ion-exchange resin, made by Rohm and Haas Co., U.S.A.), and the mixture was agitated for one hour to make the enzyme adsorb on the resin. The resin was separated by centrifuge. To the resin adsorbing the enzyme was added 10 liters of 0.2 M Na$_2$HPO$_4$ and then the mixture was made alkaline to pH 7.5 with aqueous ammonia and agitated for one hour, by which the enzyme was eluted. To 12 liters of the eluate was added solid ammonium sulfate so as to be 60% saturation and the mixture was allowed to stand at 4°C overnight. The resulting precipitates were separated by filtration and dissolved in 1.8 liters of tap water to give an aqueous solution containing enzymes. The aqueous solution was regulated to pH 2.0 with 1N HCl and agitated at room temperature for 30 minutes. After neutralizing to pH 6.0 with 1N NaOH, the solution was dialyzed against running water to give 2.3 liters of solution. The solution thus obtained was lyophilized to give 6.8 g of enzyme powder.

EXAMPLES 2 to 6

The aqueous solution containing enzymes obtained in the same manner as described in Example 1 was regulated at various pH values with 1N HCl. After agitating at room temperature for 30 minutes, the mixture was filtered. On the filtrate the residual activity of the microorganism cells lytic enzyme (hereinafter referred to as residual cells lytic activity) and the residual protease activity were measured. The results are shown in Table I.

EXAMPLES 7 to 12

The aqueous solution containing enzymes obtained in the same manner as described in Example 1 was regulated to various pH values with 1N HCl. After agitating at room temperature for 30 minutes, the mixture was neutralized to pH 6.5 with 1N NaOH and then filtered by using a filter paper. On the filtrate the residual cells lytic activity and the residual protease activity were measured as like as in Examples 2 to 6. The results are shown in Table II.

As made clear from the results shown in Tables I and II, only proteases were inactivated at pH 3.0 to 1.0 without inactivation of the present enzyme.

EXAMPLES 13 to 19

The aqueous solution containing enzymes obtained in the same manner as described in Example 1 was regulated to pH 2.0 with 1N HCl. The mixture was neutralized to pH 6.5 with 1N NaOH immediately or after allowing to stand at room temperature for 30, 60 or 120 minutes. Then, the mixture was dialyzed against running water and filtered. The filtrate was lyophilized to give enzyme powder.

The above procedure was repeated excepting that after regulating the pH value with 1N HCl, the mixture was allowed to stand at 4°C to give enzyme powder.

On these enzyme powders the residual cells lytic activity and the residual protease activity were measured as like as in Examples 2 to 6. The results are shown in Table III. As made clear from these results, when the temperature was room temperature or below, the residual cells lytic and protease activities were not affected by the temperature. Furthermore, the standing period did not give any effect on the activities and any lowering of the residual cells lytic activity was not observed for 120 minutes.

EXAMPLES 20 to 32

The aqueous solution containing enzymes obtained in the same manner as described in Example 1 was regulated to pH 2.0 with various acids. The mixture was neutralized to pH 6.5 with various alkalis and filtered by using a filter paper. On the filtrate the residual cells lytic activity and the residual protease activity were measured as like as in Examples 2 to 6. The results are shown in Table IV.

EXAMPLES 33 to 38

The aqueous solution containing enzymes obtained in the same manner as described in Example 1 was regulated to various pH values with 1N HCl. The mixture was filtered and then immediately lyophilized to give enzyme powder.

On the other hand, the mixture regulated pH value with 1N HCl as above was neutralized to pH 6.5 with 1N NaOH and then the mixture was immediately filtered and lyophilized to give enzyme powder.

As a control, the aqueous solution containing enzymes was lyophilized without treatment with the acid or the alkali to give enzyme powder.

On these enzyme powders the residual cells lytic activity and the residual protease activity were measured as like as in Examples 2 to 6. The results are shown in Table V. As made clear from these results, when the acid-treated solution was lyophilized without neutralization with an alkali, the residual cells lytic activity was lowered in comparison with those which are lyophilized after neutralization.

Equation (I):

$$\text{Unit/ml. or mg.} = \frac{(a-b)-(a-c)}{0.001 \cdot t \cdot v} = \frac{c-b}{0.001 \cdot t \cdot v}$$

$a$: Optical density of the reaction mixture at 600 m$\mu$ at zero reaction time
$b$: Optical density of the reaction mixture at 600 m$\mu$ after $t$ minute(s)
$c$: Optical density of the control solution at 600 m$\mu$ after $t$ minute(s)
$t$: Reaction time (minute)
$v$: Amount (ml. or mg.) of actually used original enzyme solution or powder Table I

| Number of Example | pH value | Residual cells lytic activity (%)*1 | Residual protease activity (%)*2 |
|---|---|---|---|
| Original enzyme solution | 6.5 | 100 | 100 |
| 2 | 3.5 | 95.4 | 89.7 |
| 3 | 3.0 | 101.3 | 33.6 |
| 4 | 2.5 | 108.6 | 10.9 |
| 5 | 2.0 | 97.4 | 9.7 |
| 6 | 1.5 | 95.1 | 12.0 |

[Remarks]
*1 Relative cells lytic activity when the cells lytic activity of the original enzyme solution was 100.
*2 Relative protease activity when the protease activity of the original enzyme solution was 100. The protease activity was measured by Kunitz's casein hydrolysis method (Kunitz, M: J. Gen. Physiol., Vol. 30, pages 291 – 310, 1947: Crystalline soybean trypsin inhibitor II, General Properties).

Table II

| Number of Example | pH value (Treated with acid) | Residual cells lytic activity (%) | Residual protease activity (%) |
|---|---|---|---|
| Original enzyme solution | 6.5 | 100 | 100 |
| 7 | 3.5 | 97.4 | 90.0 |
| 8 | 3.0 | 106.6 | 75.0 |
| 9 | 2.5 | 101.3 | 20.7 |
| 10 | 2.0 | 100.1 | 12.0 |
| 11 | 1.5 | 94.8 | 9.7 |
| 12 | 1.0 | 73.5 | 8.3 |

Table III

| Number of Example | Temperature | Standing period (minute) | Residual cells lytic activity (%) | Residual protease activity (%) |
|---|---|---|---|---|
| Original enzyme solution | — | — | 100 | 100 |
| 13 | Room Temp. | 0 | 93.1 | 13.2 |
| 14 | " | 30 | 97.9 | 11.9 |
| 15 | " | 60 | 91.0 | 9.8 |
| 16 | " | 120 | 104.1 | 10.2 |
| 17 | 4°C | 30 | 110.3 | 10.0 |
| 18 | " | 60 | 108.3 | 15.6 |
| 19 | " | 120 | 103.4 | 9.5 |

Table IV

| Number of Example | Kind of acid | Kind of alkali | Residual cells lytic activity (%) | Residual protease activity (%) |
|---|---|---|---|---|
| Original enzyme solution | — | — | 100 | 100 |
| 20 | HCl | NaOH | 93.5 | 14.1 |
| 21 | " | KOH | 91.4 | 12.0 |
| 22 | " | NH$_4$OH | 101.3 | 10.5 |
| 23 | " | Na$_2$CO$_3$ | 98.7 | 9.8 |
| 24 | H$_2$SO$_4$ | NaOH | 91.6 | 15.1 |
| 25 | " | KOH | 96.4 | 11.3 |
| 26 | " | NH$_4$OH | 102.0 | 13.0 |
| 27 | " | Na$_2$CO$_3$ | 100.4 | 13.0 |
| 28 | H$_3$PO$_4$ | NaOH | 92.9 | 17.5 |
| 29 | " | KOH | 89.1 | 11.1 |
| 30 | " | NH$_4$OH | 91.5 | 15.0 |
| 31 | " | Na$_2$CO$_3$ | 92.3 | 14.3 |
| 32 | CH$_3$COOH* | NaOH | 90.1 | 36.9 |

[Remark]
*: Glacial acetic acid was used without dilution. When the pH value was lowered to 2.7, the solution was neutralized.

Table V

| Number of Example | pH value Treated with acid | pH value Neutralized | Residual cells lytic activity (%) | Residual protease activity (%) |
|---|---|---|---|---|
| Control | — | — | 100 | 100 |
| 33 | 2.5 | — | 84.8 | 11.7 |
| 34 | 2.0 | — | 63.6 | 11.8 |
| 35 | 1.5 | — | 56.1 | 12.6 |
| 36 | 2.5 | 6.5 | 98.5 | 23.9 |
| 37 | 2.0 | 6.5 | 99.2 | 17.5 |
| 38 | 1.5 | 6.5 | 90.2 | 13.7 |

What is claimed is:

1. A method for purifying a microorganism cells lytic enzyme contaminated with proteases obtained by cultivating a microorganism of the genus Streptomyces, which comprises by regulating the pH value of an aqueous solution containing the microorganism cells lytic enzyme and proteases within a range of about 3.0 to 1.0 with an acid and filtering off the resulting precipitates of proteases.

2. The method according to claim 1, wherein the acid is a member selected from the group consisting of hydrochloric acid, sulfuric acid, phosphoric acid and acetic acid.

3. The method according to claim 1, wherein the aqueous solution containing the microorganism cells lytic enzyme and proteases is neutralized within a range of pH about 4.0 to 8.0 with an alkali before or after the filtration.

4. The method according to claim 3, wherein the alkali is a member selected from the group consisting of sodium hydroxide, potassium hydroxide, sodium carbonate, potassium carbonate, sodium bicarbonate, potassium bicarbonate, calcium hydroxide and ammonia.

* * * * *